July 20, 1954     H. S. FAIRLY     2,684,014
EYEGLASSES
Filed June 14, 1950
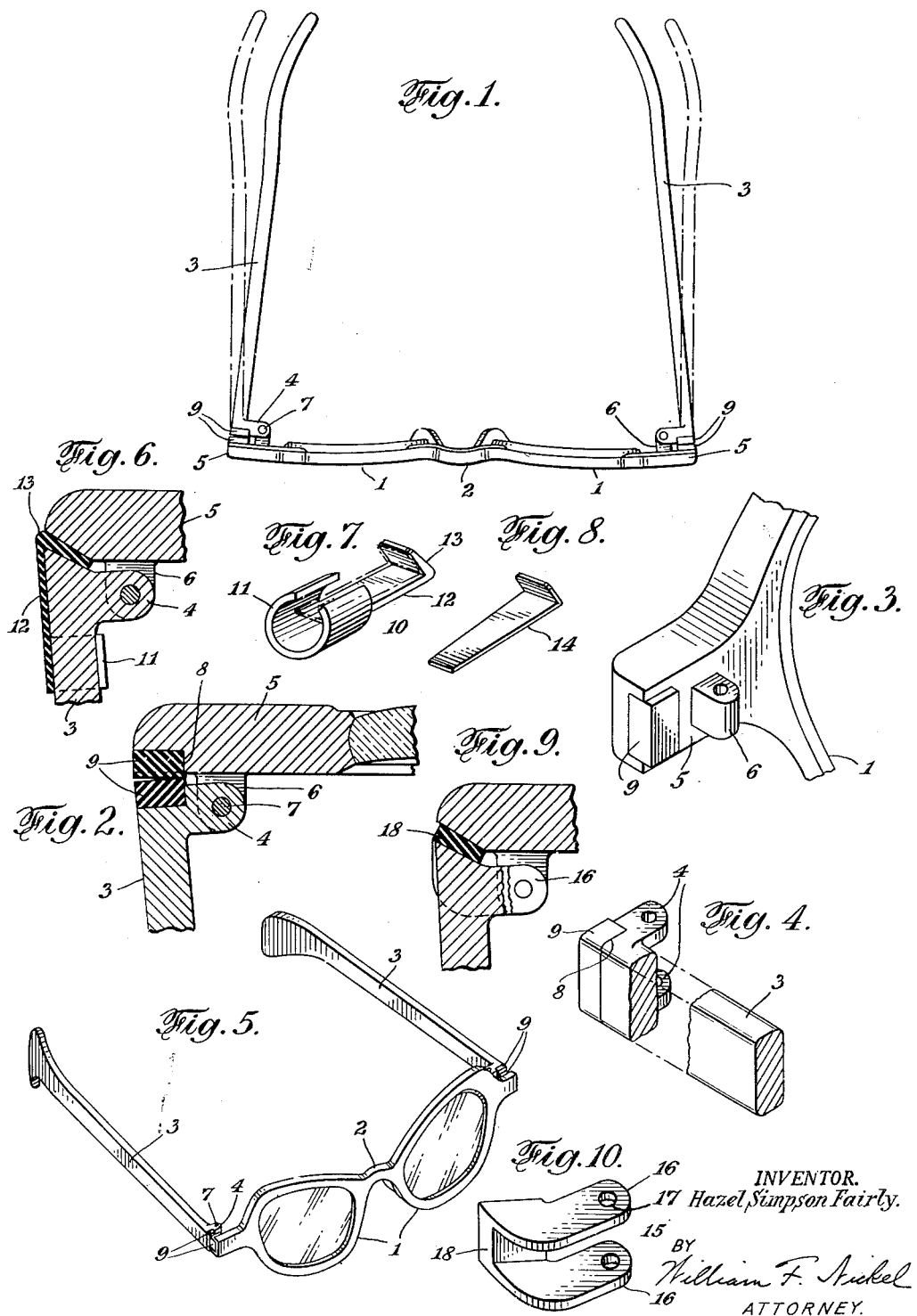
INVENTOR.
Hazel Simpson Fairly.
BY
William F. Nickel
ATTORNEY.

Patented July 20, 1954

2,684,014

UNITED STATES PATENT OFFICE 2,684,014

EYEGLASSES

Hazel Simpson Fairly, New York, N. Y.

Application June 14, 1950, Serial No. 168,061

3 Claims. (Cl. 88—53)

I have invented an improvement in the frames of eyeglasses; and particularly an eyeglass frame having arms hinged thereto for engaging the sides of the head above the ears to hold the frame with the lenses in position.

An important object of my invention is to provide such a frame with simple and inexpensive means for limiting the outward movement of the pivoted temples at the ends of the frame, so that they will always fit the sides of the head snugly. Then the glasses can be worn with ease, and risk of the glasses dropping off and sustaining damage is obviated.

A further object is to provide an eyeglass frame with cushioning elements disposed adjacent the pivots of the temples and capable of reacting to pressure so as to hold the arms or temples firmly against the sides of the head and keep the glasses comfortably in their correct position.

Other objects and advantages and the preferred embodiments of the invention are fully illustrated and described herein, and the novel features are defined in the appended claims. But this disclosure is by way of example only; and the details of structure set forth may be varied in many respects without deviation from the general design in which the improvement is incorporated.

On the drawings:

Figure 1 is a top plan of eyeglasses or spectacles according to my invention.

Figure 2 is a horizontal section through one end at the hinge or pivot for the temple at the end.

Figure 3 is a perspective view showing one end of an eyeglass frame with a cushioning member thereon, located to coact with the hinged arm or temple at that end.

Figure 4 is a similar view of one end of an arm or temple with such a member attached to it.

Figure 5 is a perspective view of the glasses.

Figure 6 is a section similar to Figure 2, showing a modified form of the invention.

Figures 7 and 8 are perspective views of the cushioning means employed in said modification;

Figure 9 is a section of another modification; and

Figure 10 is a perspective of the cushioning means used in connection with this other modification.

In Figures 1 to 5 inclusive, the numeral 1 indicates the body or principal part of the frame comprising the rims to encircle the lenses, united by a bridge member 2 to span the wearer's nose. Each arm or temple 3 has lugs 4 and each of the opposite ends of the body 1 has a projection 5 bearing a lug 6, to which the lugs 4 are connected by pivot pins or rivets 7 in holes through the lugs. The arms 3 can also be joined to the body 1 by means of small metal hinges affixed to the arms 3 and ends 5, and having similar perforated lugs for pivot pins to join the halves of the hinges together.

In each end 5 and end of each arm 3 is a recess 8 and in the recesses are elements 9 having the forms of small pieces of rubber or other resilient cushioning material, secured in the recesses 8 by any suitable means. The elements 9 project slightly from the parts carrying them, and abut when the arms 3 are distended and occupy the full line position shown on Figure 1. When the glasses are worn by the owner, the arms are spread farther apart, as indicated by the dot-and-dash lines on Figure 1, and the elements 9 are put under pressure and compressed in some degree. They react to the pressure and tend to push the arms towards each other; thus the arms are always kept firmly in contact with the sides of the head and hold the glasses firmly in front of the eyes. The material 9 can be thinner than shown and attached by cement or other means without the recesses 8.

Figures 6, 7, 8, 9, and 10 illustrate how the same effect can be obtained with an attachment or accessory that can be secured to the frame and requires no alteration of the structure thereof. The accessory member shown in Figures 6, 7, and 8 comprises a body 10 of rubber or other compressible substance having a split sleeve 11 at one end and a flat extension 12 at the other with the tip 13 extending laterally at an angle on the extremity of the shank or extension 12. This attachment is mounted on each arm 3, by laying the arm in the sleeve, which is elastic enough to be forced apart along its edges and resilient to embrace and grip the arm and hold the attachment thereon. The tip or projection 13 which tapers and grows thinner towards the outer edge is disposed between each end 5 of the body 1 and the extremity of the adjacent arm 3. The arms are again held as in Figure 1, but can be moved a little farther apart to engage the wearer's head and fit it snugly to hold the glasses firmly in place.

To vary the thickness of the tip or terminal portion 13 when necessary, a shim 14 with an end bent at the same angle as the tip 13 can be laid on the inside of the attachment 10.

The accessory 15 of Figures 9 and 10 gives similar results. This is a fitting or member having two lugs 16 with perforations 17 at one end and a bridge 18 at an incline joining the opposite ends. The lugs 16 are to receive the lugs 4 and 6 between them and the pins 7 join all the lugs together, with the lugs or portions 11 embracing the adjacent arm 3. The bridge or terminal portion 18 can have a tapering shape, somewhat thinner along one edge, and it extends in such a direction with respect to the length of the attachment 15 that it then lies between the end of an arm 3 and the adjacent end 5 of the body 1 with its inner edge close to the pivot. These attachments can be manufactured at little expense and can be quickly mounted on any eyeglass frames if the arms 3 thereof become too divergent due to wear and use.

The frame illustrated on Figures 6 and 9 has bevelled faces on the ends 5 and adjacent extremities of the arms 3. To such faces the elements or members 9 can be secured if desired. In Figures 1, 2, 3 and 5 the frame has no such bevelled faces, but the ends of the arms 3 and sides of the terminal portions 5 are shaped to meet each other squarely; but the accessories 10 and 15 can be utilized with this frame also, if made with the tip 13 at a right angle to the shank, and the bridge 18 parallel to the long axis of the fitting 15. The tips 13 and connecting parts 18 of course need not be wedge-shaped, but can be of even thickness throughout if required.

Having described my invention, what I believe to be new is:

1. An eyeglass frame having rims for lenses, a bridge member uniting said rims, said frame having opposite outer ends, a pair of arms and pivot pins connecting each arm at one end to an outer end of the frame, said outer ends of the frame overlapping said ends of the arms, and an accessory of resilient compressible material for each arm, said accessories each having parts extending from one side of said arm across the upper and lower sides thereof to the other side and thus embracing the arm at said one end and having a terminal portion extending across said one end and between said arm and said frame, and in close contact with said end of the arm to engage the adjacent outer ends of the frame when the arms are spread apart.

2. An eyeglass frame having rims for lenses, a bridge member uniting said rims, said frame having opposite outer ends, a pair of arms and pivot pins connecting each arm at one end to an outer end of the frame, said outer ends of the frame overlapping said ends of the arms, and an accessory of resilient compressible material for each arm, said accessories each having parts embracing an adjacent arm at said one end, and a terminal portion extending across said end, said parts having the forms of lugs secured at one end to said pivot pins, the terminal portion bridging the opposite ends of said lugs, and disposed in close contact with said end of the arm to engage the frame at the adjacent end thereof when the arms are spread apart.

3. An eyeglass frame having rims for lenses, a bridge member uniting said rims, said frame having opposite outer ends, a pair of arms and pivot pins connecting each arm at one end to an outer end of the frame, said outer ends of the frame overlapping said ends of the arms, and an accessory of resilient compressible material for each arm, said accessories each having parts embracing said arm at said one end, and a terminal portion extending across said one end, said parts forming a split sleeve on each arm, the terminal portion being a laterally extending tip, the accessory having an extension uniting the tip to the sleeve, said tip being in close contact with said end of the arm to engage the frame at the adjacent end thereof when the arms are spread apart.

References Cited in the file of this patent

UNITED STATES PATENTS

| Number | Name | Date |
|---|---|---|
| 2,026,723 | Wollensak | Jan. 7, 1936 |
| 2,145,307 | Hunt | Jan. 31, 1939 |
| 2,331,512 | Siedschlag | Oct. 12, 1943 |

FOREIGN PATENTS

| Number | Country | Date |
|---|---|---|
| 23,133 | Great Britain | Oct. 27, 1904 |
| 162,502 | Switzerland | Sept. 1, 1933 |
| 597,064 | Great Britain | Jan. 16, 1948 |